United States Patent [19]
Abe

[11] 3,870,410
[45] Mar. 11, 1975

[54] MARK READER
[75] Inventor: Takeshi Abe, Yokohama, Japan
[73] Assignee: Ricoh Co., Ltd., Tokyo, Japan
[22] Filed: Aug. 28, 1973
[21] Appl. No.: 392,178

[30] Foreign Application Priority Data
Sept. 12, 1972 Japan............................ 47-90921

[52] U.S. Cl.................................. 353/26, 250/561
[51] Int. Cl....................... G03b 23/12, G03b 21/11
[58] Field of Search...... 353/25, 26, 27; 250/209 X, 250/209, 557, 561

[56] References Cited
UNITED STATES PATENTS
3,299,272  1/1967  Furukawa........................ 250/209
3,744,890  7/1973  Suzuki................................ 353/26

Primary Examiner—Richard E. Aegerter
Assistant Examiner—A. J. Mirabito
Attorney, Agent, or Firm—Cooper, Dunham, Clark, Griffin & Moran

[57] ABSTRACT

A mark reader is provided for use in an apparatus for projecting onto a screen or copying desired information retrieved from a number of information blocks recorded on a roll of film while the latter is being moved. The mark reader reads a mark associated with each information block on the roll of film.

6 Claims, 5 Drawing Figures

MARK READER

BACKGROUND OF THE INVENTION

The invention relates to a mark reader for reading a mark associated with each information block recorded on a roll of film and which is adapted to be used in an apparatus for projecting or copying a desired information retrieved from the roll of film.

An apparatus is known which projects a selected information block recorded on a roll of film in the form of a microphotograph onto a screen for viewing or project it onto copying paper for copying by the use of the electrophotographic process. Such an apparatus is associated with an information retrieval system which retrieves a desired information block from a large quantity of informations recorded on a roll of film. In the prior art arrangement an information retrieval system of this knid, marks are applied to respective frames on the roll of film, which is illuminated by an illumination system for reading such marks by way of an optical system which comprises a lamp, a condenser lens, and a light receiving element, such optical system being separate from a projection system which is used to project the recorded information. The pulses derived from the optical system are counted to stop the film movement when the count has become equal to a preset value. In the prior art arrangement, such optical system has been located at a distance away from the illumination and projection system or has been applied to detect the image of a mark projected onto the screen together with the desired information. However, such an apparatus is disadvantageous in respect of space requirements because the optical system comprising a lamp, a condenser lens and a light receiving element is provided separate from, and in addition to the projection system for the information on the roll of film. An apparatus for projecting or copying information recorded on a microfilm may be of the film rotation type in which a film unit comprising the microfilm and the projection system is rotated through an angle, or of the scanning type in which the film unit is moved crosswise of the film. The film rotation takes place when use is made of a microfilm in which information block are recorded along the film length, while scanning takes place when more than one frames of information are recorded across the width of the microfilm. It is difficult, in view of the space available, to provide a light source dedicated to mark detection for direct detection of marks associated with frames, because of the film movement in the process of film rotation or scanning. Furthermore, when the amount of light from the light source varies, the timing of detecting the mark may vary erroneously, causing an error in the position in which the respective frame of the microfilm stops. Moreover, because the system is susceptible to variations in luminance due to scanning, lamp aging, fluctuations of applied voltage, and dirt on the optical system, there might occur a failure to read the mark. It may be contemplated to read the mark by receiving, with a single light receiving element, the light from the illumination system associated with the information retrieval system for the roll film as it is transmitted through an area of the film in which the mark is provided. However, such an arrangement, while advantageous in respect of space requirements, is subject to a variation in luminance due to a variation in projection magnification in addition to those variations in luminance due to lamp aging, fluctuations of applied voltage and dirt on the optical system, thereby causing a further instability in reading the mark.

SUMMARY OF THE INVENTION

In accordance with the invention, a pair of light receiving elements are used to receive light from a light source as transmitted through a roll of film, and their outputs are converted into their respective logarithms. The logarithmic conversion enables a reasonable threshold level to be used, which provide an effective mark detection in the presence of variations in the luminance of the light falling on the light sensitive elements. A difference between such logarithms is formed and a positive or negative component thereof is derived depending upon the forward or reverse direction of film feed, thereby providing a mark reader which is advantageous with respect of space requirements and capable of assuring a correct stop position of each frame when the running direction of the film is changed and also assuring a stabilized operation upon occurrence of a substantial change in the amount of light as caused by scanning, lamp aging, fluctuations of applied voltage or dirt on the optical system.

DETAILED DESCRIPTION OF A PREFERRED EMBODIMENT

Figure 1:
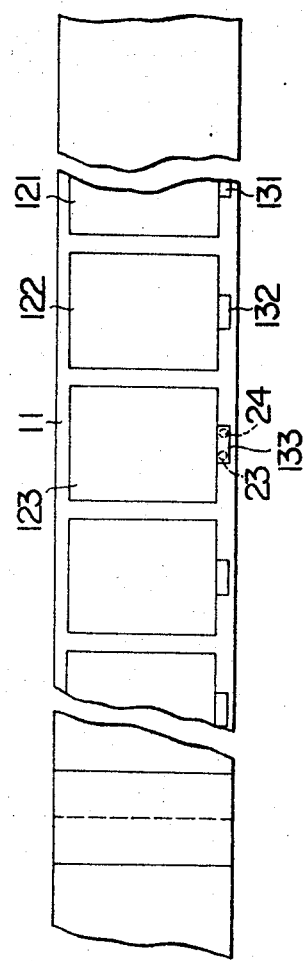
FIG. 1 is a plan view of one example of a roll of film used in the invention.
Figure 2:
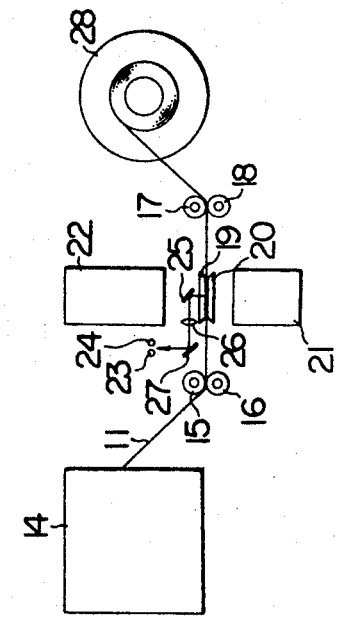
FIG. 2 is a schematic elevation illustrating one embodiment of the film projector in which the invention is applied.

A film roll 11 shown in FIG. 1 contains a number of frames 12l to 12n which are spaced apart lengthwise therealong at given intervals and in which information is recorded in the form of a microphotograph. Marks 13l to 13n are recorded along one edge of the film 11 at respective positions which correspond to the center of each frame 12l to 12n. As shown in FIG. 2, the film 11 is stored in the form of a roll on a film cartridge 14. A film path is defined by two pairs of rollers 15, 16 and 17, 18, which are held resiliently in abutting relationship, as well as a transparent pressure plate 19 and a transparent plate 20 which are positioned opposite each other intermediate the roller pairs, on opposite side of the film path. An illumination system 21 is disposed below the transparent plate 20 and is adapted to illuminate one frame of the film 11 which is positioned on the transparent plate 20. A projection system 22 is disposed above the pressure plate 19 for projecting light which is transmitted through one frame of the film 11 positioned below the pressure plate 19 onto a screen or onto a copying paper for the purpose of copying. An optical system for deriving light from the illumination systems 21 which is transmitted through the edge of the film 11 in which frame marks 13l to 13n are provided, and through the transparent plate 20 and the pressure plate 19 to a pair of light receiving elements 23 and 24, is provided and comprises a reflecting mirror 25. The light reflected by the mirror 25 passes through a lens 26 to be reflected by another reflecting mirror 27 to be made incident upon the light receiving element 23 and 24. As illustrated by a transposition onto a mark in FIG. 1, the light receiving elements 23 and 24 are disposed along a direction parallel to the direction of travel of the film and spaced apart by a distance less than the length of the image of a single frame mark which is in an illuminated position. These elements are positioned so that an equal amount of light impinges upon each of them from the illumination system 21 through the transparent plate 20, pressure plate 19, reflecting mirror 25, lens 26 and reflecting mirror 27. A leader of the film roll 11 is reeled off the film cartridge 14, passed between the rollers 15, 16, between the pressure plate 19 and transparent plate 20 and between the rollers 17, 18 successibly to be secured to the winding shaft of a take-up reel 28. When either the combination of roller 17 and take-up reel 28 or roller 15 and film cartridge 14, is rotatably driven by a motor, not shown, the film is fed to the right or to the left, respectively. The film portion which lies on the transparent plate 20 is illuminated by the illumination system 21, while the which transmitted through the edge portion of the film 11 in which frame marks are provided is received by the light receiving elements 23 and 24 through the optical system comprising the reflecting mirror 25, lens 26 and reflecting mirror 27.

Figure 3:
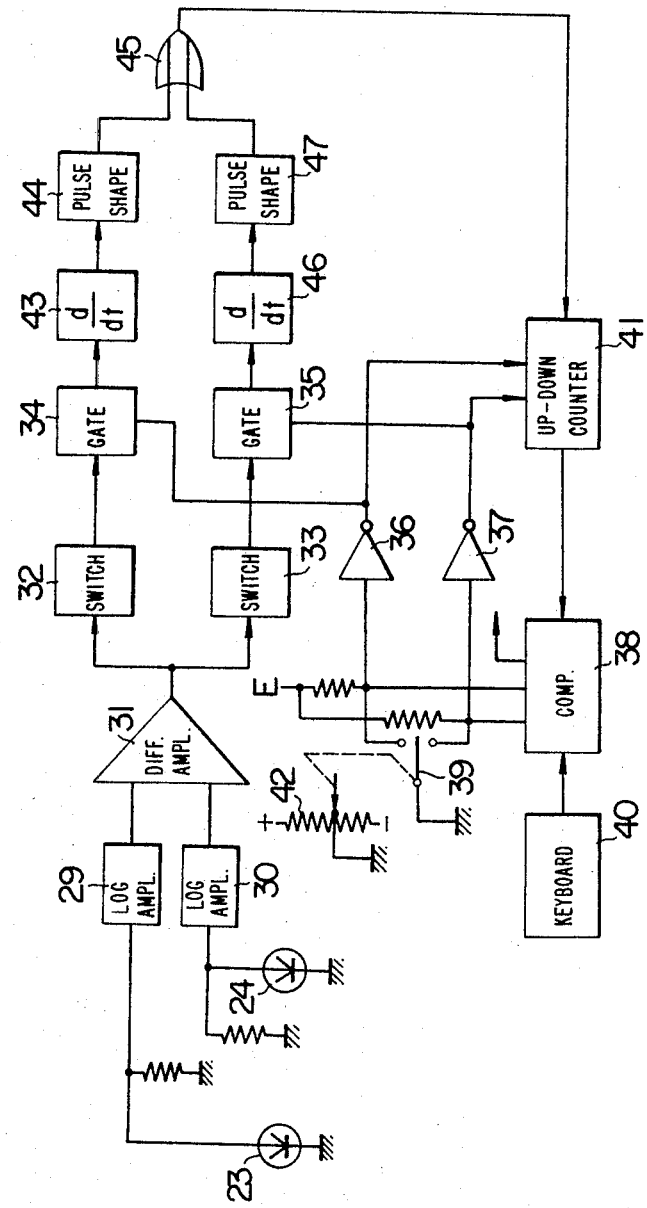
FIG. 3 is a block diagram showing the electrical system of the film projector shown in FIG. 2.
Figure 4:
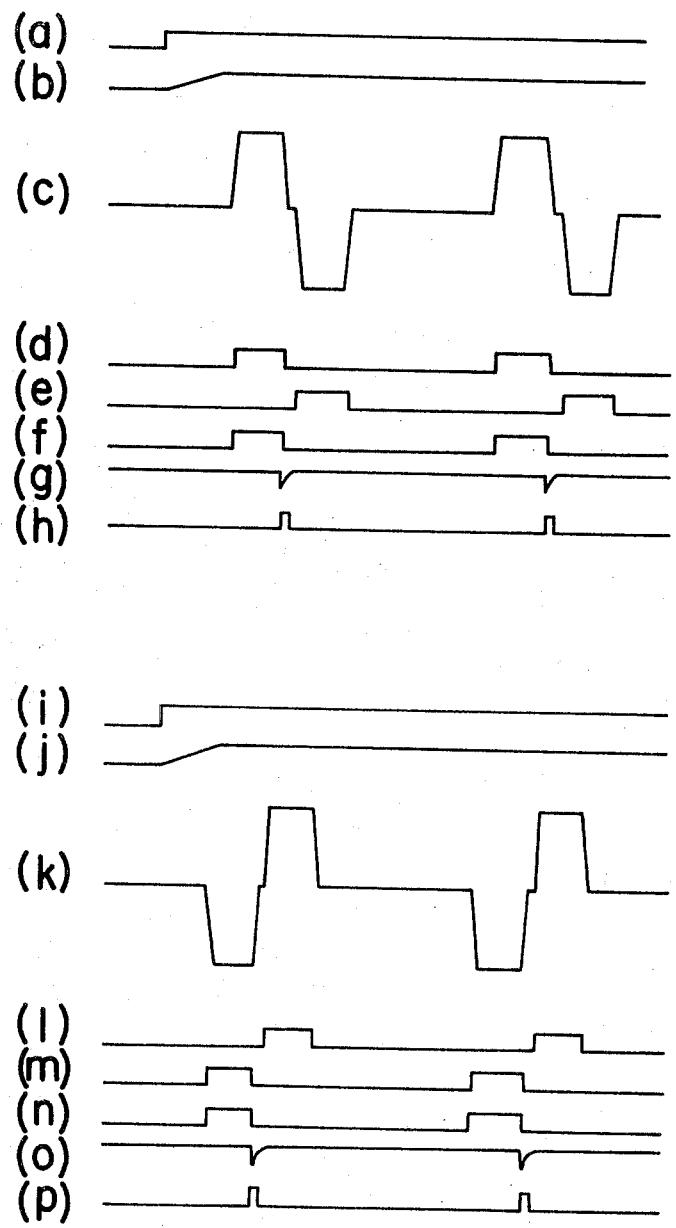
FIGS. 4 (a) to (p) are timing charts illustrating the operation of the system shown in FIG. 3.

As shown in FIG. 3, the light receiving elements 23 and 24 are connected with the inputs of logarithmic amplifiers 29 and 30 which are adapted to convert the output signals from the elements 23 and 24 into their logarithmic functions. The output signals from the logarithmic amplifiers 29 and 30 are applied to a differential amplifier 31 which derives a difference between the output signal voltages of the logarithmic amplifiers 29 and 30. Assuming now that the motor (not shown) is driven as shown in FIG. 4 (a) and its number of revolutions increases as shown in FIG. 4 (b) to feed the film 11 forwardly or to the right as viewed in the drawings, the differential amplifier 31 will produce an output signal as shown in FIG. 4 (c). As shown, the waveform illustrated includes a positive going excursion followed by a ground level before changing to a negative going excursion. This follows from the fact that the both light receiving elements are spaced apart by a distance less than the length of a single mark. Hence, it will be approximated that the ground level portion of the waveform corresponds to the center of the mark, whereby the trailing edge of the positive going excursion provides a good approximation of such position. The output signal of the differential amplifier 31 is applied to a pair of switching circuits 32 and 33 in order to provide a splitting of positive and negative components as shown in FIGS. 4 (d) and (e), respectively. The output signals of the switching circuits 32 and 33 are applied to gate circuits 34 and 35 which are in turn controlled by the output signals from inverters 36 and 37, respectively. The inverters 36 and 37 are controlled by a comparison circuit 38 and a switch 39. The comparison circuit 38 functions to compare the output signal from a keyboard unit 40 and the output signal from an up-down counter 41. The keyboard unit 40 is adapted to produce a signal corresponding to a frame number of the film 11 which is to be retrieved when such frame number is set with a key. The up-down counter 41 functions to count the number of frames to thereby derive the number of a frame of the film 11 which is in the projection position. When the frame number from the up-down counter 41 is less than the frame number preset in the keyboard unit 40, the comparison circuit 38 applies a gating voltage to the gate circuit 34 through the inverter 36. Conversely, when the frame number from the up-down counter 41 is greater than the frame number preset in the keyboard unit 40, the comparison circuit 38 applies a gating voltage to the gate circuit 35 through the inverter 37. Gating voltages are also supplied by a switch 39 which is interlocked with a variable resistor 42 and which is driven by operation of a manual retrieval knob (not shown). Specifically, when the manual retrieval knob is operated to feed the film 11 to the right, the switch 39 connects the input terminal of the inverter 36 with ground to provide a gating voltage to the gate circuit 34, and when the knob is operated to feed the film 11 to the left, the switch 39 connects the input terminal of the inverter 37 with ground to provide a gating voltage to the gate circuit 35. When the slider on the variable resistor 42 moves either above or below the center which is grounded, the motor (not shown) rotates either in the forward or reverse direction to feed the film 11 to the right or to the left, respectively. The number of revolutions of the motor increases as the slider on the variable resistor 42 is further removed from the center. In this manner, the gate circuit 34 is opened when the film 11 is fed to the right to provide an output signal as shown in FIG. 4 (f), while the gate circuit 35 is closed at this time. The output signal from the gate circuit 34 is applied to a differentiator 43 which differentiates its trailing edge to provide a waveform such as is shown in FIG. 4 (g). The output signal of the differentiator 43 is passed through a shaper 44 which provides a shaped waveform as shown in FIG. 4 (h), which is passed through an OR circuit 45 to the up-down counter 41. Due to the presence of the output signal from the inverter 36, the up-down counter 41 upcounts in response to the output signal from the OR circuit 45. When the motor is driven in the reverse direction as shown in FIG. 4 (i) and its number of revolutions increases as shown in FIG. 4 (j) to feed the film 11 reversely or to the left as viewed in the drawings, the differential amplifier 31 will produce an output signal such as is shown in FIG. 4 (k). It will be noted that the ground level portion of this output signal corresponds to the center of the mark as mentioned previously, and that the trailing edge of the negative excursion provides a good approximation of such position. At this time, the switching circuits 32 and 33 will produce output signals as shown in FIGS. 4 (l) and (m), but the gate circuit 34 is closed while the gate circuit 35 is opened to produce an output signal as shown in FIG. 4 (n). The output signal from the gate circuit 35 is applied to a differentiator 46 which differentiates its trailing edge to produce a pulse as shown in FIG. 4 (o). This output signal from the differentiator 46 is passed through a shaper 47 to provide a shaped waveform as shown in FIG. 4 (p), which is applied through an OR circuit 45 to the up-down counter 41. Due to the presence of the output signal from the inverter 37, the up-down counter 41 downcounts in response to the output signal from the OR circuit 45. When the frame number from the up-down counter 41 becomes equal to the frame number preset in the keyboard unit 40, the comparison circuit 38 produces a coincidence signal, which acts to interrupt the motor operation to stop the film 11, except during manual retrieval. The frame of the film 11 which is retrieved and positioned on the transparent plate 20 is illuminated by the illumination system 21 for projection of the recorded information therein by the projection system 22.

Figure 5:
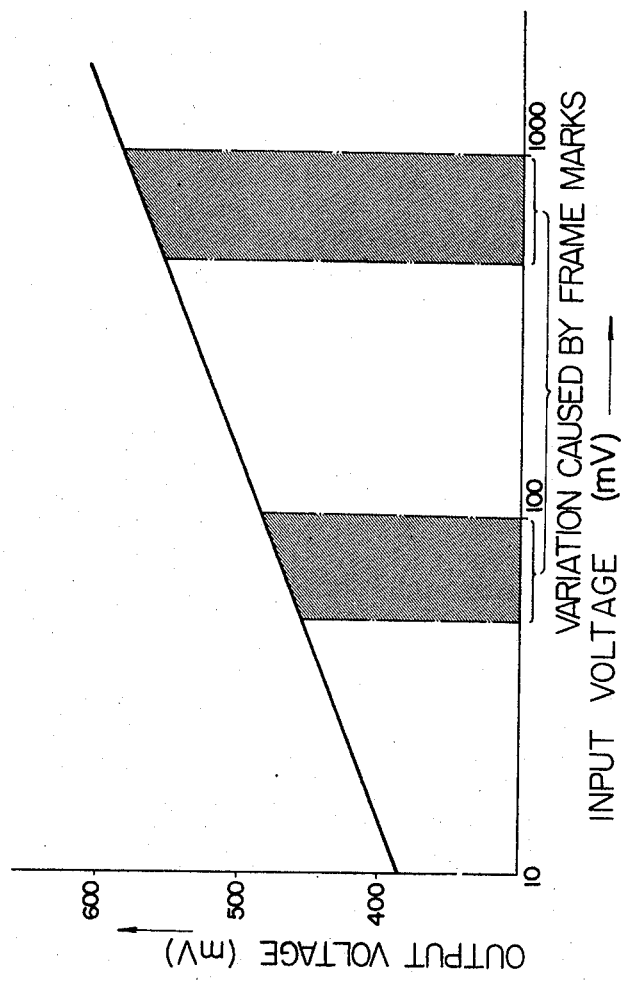
FIG. 5 is a graph depicting the input-output characteristic of a logarithmic amplifier shown in FIG. 3.

The amount of light incident upon the light receiving elements 23 and 24 from the illumination system 21 through the path including the transparent plate 20, the pressure plate 19, reflecting mirror 25, lens 26 and reflecting mirror 27 undergoes a large variation on account of factors such as a variation of projection magnification and the like, and there is a logarithmic relationship between its magnitude and the variation of the light quantity caused by the frame mark. The logarithmic amplifiers 29 and 30 function to convert the output voltages from the light receiving elements 23 and 24 into their respective logarithmic functions as shown in FIG. 5, whereby the variation of the light quantity as caused by the frame mark is rendered nearly constant at the output of the logarithmic amplifiers 29 and 30. As a consequence, the reading of marks can take place in a stabilized manner independently from variations of the light quantity.

It will be understood that the projections system 22 may include a rotary prism for causing rotation of a projected image. In addition, a film unit scanning system may be incorporated whereby the film cartridge 14, take-up reel 28 and rollers 15 to 18 can be translated cross-wise of the film.

What is claimed is:

1. A system for indexing with a projection position a selected frame of a film roll having a plurality of frames and a plurality of frame marks, each mark associated with a frame and capable of modulating a light beam, including:
    means for moving the film along a defined path to thereby move successive film frames along a frame path intersecting the projection position and to move the marks along a mark path;
    means for generating a light beam intersecting the mark path and modulated by the frame marks traversing the beam as the film moves along its path;
    a first and a second detector disposed in the path of the modulated beam and spaced from each other along the mark path by a distance less than the maximum width of the modulated beam so that the first detector and then both detectors are illuminated by the modulated beam as a mark traverses the beam moving in a first direction along the mark path, but the second detector and then both detectors are illuminated by the modulated beam as a mark traverses the beam moving in the opposite direction along the mark path, each detector providing a mark detection signal when illuminated by the modulated beam;
    first and second means for nonlinearly transforming the mark detection signals of said first and second detector respectively to provide a respective first and second transformed signal;
    means for comparing the transformed signals and for providing on the basis of the comparison a signal indicating the direction of movement of the film along its path and the number of frames that have traversed the projection position, and means responsive to said signal to stop the film when a selected film frame is indexed with the projection position.

2. A system as in claim 1 wherein the means for nonlinearly transforming the mark detection signals comprises means for providing transformed signals which are logarithmic functions of said mark detection signals.

3. A system as in claim 2 wherein the comparing means comprises a differential amplifier receiving said transformed signals as inputs and providing as an output a differenced signal which is of a first polarity when the film moves in said first direction and is of an opposite polarity when the film moves along said opposite direction.

4. A system comprising:
    a film having a plurality of frames and a corresponding plurality of frame marks, each mark associated with a frame and each mark capable of modulating a light beam impinging thereon;
    means for selectively moving the film in a forward and in a reverse direction to thereby move successive frames through a projection position and the corresponding marks through a mark detecting position;
    means for generating a mark detecting beam intersecting the mark detecting position and modulated by marks intersecting said mark detecting position to provide a modulated beam;
    a first and a second detector disposed in the path of the modulated beam and spaced apart from each other along a direction transverse to the beam by a distance less than the maximum width of the modulated beam impinging on the detectors, whereby the first and then both detectors are illuminated by the modulated beam as a mark traverses the beam while the film moves in the forward direction, but the second detector and then both detectors are illuminated by the beam as a mark traverses the detecting position while the film moves in the reverse direction, each detector providing a mark detection signal when illuminated by the modulated beam;
    first and second means for nonlinearly transforming said mark detection signals to provide transformed signals;
    means for comparing the transformed signals and for providing, on the basis of the comparison, a first direction count signal when the transformed signals indicate that the film is moving in the forward direction and a second direction count signal when the transformed signals indicate that the film is moving in the reverse direction;
    a bidirectional counter counting in a first and a second direction respectively in response to said first direction and second direction count signals;
    a keyboard for providing a signal indicating the number of a desired film frame;
    a comparator comparing the signal provided by the keyboard and a signal corresponding to the contents of the counter and for providing a coincidence signal when the two compared signals have a defined relationship; and
    means responsive to said coincidence signal for stopping the film to thereby index a desired frame with the projection position.

5. A system as in claim 4 wherein said means for nonlinearly transforming the detection signal comprises providing transformed signals which are logarithmic functions of the detection signals.

6. A system as in claim 5 wherein the comparing means comprises means for subtracting the transformed signals from each other and for providing count signals in a first direction if the subtraction result is of a first polarity and for providing count signals in a second direction if the subtraction results is of the opposite polarity.

* * * * *